(12) United States Patent
Liu

(10) Patent No.: US 10,711,812 B2
(45) Date of Patent: Jul. 14, 2020

(54) HOLDER FOR MOBILE PHONES

(71) Applicant: Jianbo Liu, Huizhou (CN)

(72) Inventor: Jianbo Liu, Huizhou (CN)

( * ) Notice: Subject to any disclaimer, the term of this patent is extended or adjusted under 35 U.S.C. 154(b) by 0 days.

(21) Appl. No.: 16/131,385

(22) Filed: Sep. 14, 2018

(65) Prior Publication Data

US 2019/0249697 A1 Aug. 15, 2019

(51) Int. Cl.
| | | |
|---|---|---|
| *H01M 10/46* | (2006.01) | |
| *F16B 2/18* | (2006.01) | |
| *F16B 2/12* | (2006.01) | |
| *H02J 7/00* | (2006.01) | |
| *H02J 50/10* | (2016.01) | |
| *H02J 7/02* | (2016.01) | |

(52) U.S. Cl.
CPC ............ *F16B 2/185* (2013.01); *F16B 2/12* (2013.01); *H02J 7/0042* (2013.01); *H02J 7/025* (2013.01); *H02J 50/10* (2016.02)

(58) Field of Classification Search
CPC . H02J 7/0042; H02J 7/355; F16B 2/18; F16B 2/185
USPC .................................................. 320/114, 115
See application file for complete search history.

(56) References Cited

U.S. PATENT DOCUMENTS

| | | | |
|---|---|---|---|
| 2016/0193968 A1* | 7/2016 | Oldani | B60R 11/02 296/37.12 |
| 2017/0188724 A1* | 7/2017 | Lin | E05B 73/0082 |
| 2017/0237843 A1* | 8/2017 | Ackeret | H04M 1/04 455/575.9 |

* cited by examiner

*Primary Examiner* — Edward Tso
(74) *Attorney, Agent, or Firm* — Bay State IP, LLC

(57) ABSTRACT

The present invention provides a mobile device holder, which relates to the technical field of holder device designs. Gravitational mobile phone holders in the prior art are easy to loosen and the mobile phones are easy to fall off the holders when bouncing up. The holder according to the present invention includes a clamping arm, a lower supporting arm and a link mechanism. The link mechanism links the clamping arm and the lower support arm in a rotatable manner. The mobile device holder further comprises a lock mechanism, which acts on the link mechanism and causes the link mechanism to enable one-way linkage. On the basis of current gravitational device holders, the present invention is provided with a lock mechanism which causes the link mechanism to enable one-way linkage, so that the link mechanism can rotate only in the direction that the clamping arm clamps the mobile phone.

10 Claims, 4 Drawing Sheets

HOLDER FOR MOBILE PHONES

CROSS REFERENCE TO RELATED APPLICATION

This application takes priority from and claims the benefit of Chinese Patent Application Serial No. 201820258585.0 filed on Feb. 13, 2018, the contents of which are herein incorporated by reference.

TECHNICAL FIELD

The invention relates to the technical field of holder device designs, and in particular to a mobile device holder.

BACKGROUND

Portable mobile devices such as mobile phone become increasingly applauded by people and the mobile devices are used in more and more occasions. It is needed to configure different holders for mobile phones in different occasions so as to meet combined functions of different angles, different heights, even charging, etc. In the prior art, there is a variety type of mobile phone holders meeting the requirements of keeping mobile phones at certain heights and convenient to move. Particularly, a mobile phone holder designed for vehicles, which clamps a mobile phone by means of the gravity of the mobile phone, is widely accepted by people. The specific structure of the holder includes left and right clamping arms and a bottom supporting arm. The mobile phone presses the bottom supporting arm using the gravity of the mobile phone itself, so that the left and right clamping arms are stressed to translate inwards to form a clamping state. Consequently, the mobile phone is fastened. A spring is provided between a supporting seat and the bottom supporting arm. When the mobile phone is taken away, the spring enables the bottom supporting arm to move upwards; and then the left and right clamping arms are stressed to translate outwards to form an expanded state, so that the holder is opened.

In current gravitational mobile phone holders, the clamping arms at two sides clamp a mobile phone when the mobile phone is placed on the bottom supporting arm. When the mobile phone is off the bottom supporting arm, the clamping arms at two sides are opened automatically. Therefore, for vehicle mobile phone holders, when the vehicle bumps, the mobile phone is easy to bounce up, and at such time, the clamping arms at two sides are separated. As a result, the mobile phone is easy to fall off the holder because of lacking no clamping force. The applicant finds that the prior art at least has the following defects: current gravitational mobile phone holders are easy to cause instable clamping and the clamped mobile phone is easy to fall off the holder when the holder encounters shaking or bumping.

SUMMARY

The present invention aims to provide a device holder, so as to solve the technical problems in the prior art that the gravitational mobile phone holders are easy to loosen and the mobile phones are easy to fall off the holders when bouncing up. Hereinafter is illustrated many technical effects that can be produced by the preferred technical schemes in numerous technical schemes of the present invention.

In order to achieve the above aim, the present invention provides the following technical schemes. A mobile device holder provided by the invention includes a clamping arm, a lower supporting arm and a link mechanism. The link mechanism links the clamping arm and the lower support arm in a rotatable manner. The mobile device holder further includes a lock mechanism, which acts on the link mechanism and causes the link mechanism to enable one-way linkage.

Preferably, the link mechanism is provided as a link gear, the lock mechanism is provided as a snap projection which is fixed relative to a gear shaft of the link gear, and the snap projection and the link gear are in snap-fit connection of one-way rotation.

Preferably, the link mechanism is provided as a link gear and further includes a seat wheel, the seat wheel and the link gear are fixed coaxially, the seat wheel has an edge provided with a ratchet, the snap projection has a tail end provided with a pawl, the pawl and the ratchet are matched so that the link gear is rotated in only one direction.

Preferably, the mobile phone holder further includes a rear cover, and the snap projection and the rear cover have a first elastic element provided therebetween.

Preferably, the first elastic element is provided as a reset spring.

Preferably, the seat wheel has provided thereon an arc block sheet transiting to the edge of the seat wheel, and the arc block sheet is used for enabling the pawl to transit into the ratchet.

Preferably, the mobile phone holder further includes a front cover, the snap projection and the front cover have a second elastic element provided there between, and the second elastic element is used for enabling the snap projection to move in the direction towards the seat wheel.

Preferably, the second elastic element is provided as a reset spring.

Preferably, the snap projection is provided with a limit seat at two sides thereof, and the limit seat is used for limiting the swing amplitude of the snap projection.

Preferably, the mobile device holder is further provided with a button, which acts on the snap projection so that the snap projection is disengaged from the link gear.

Preferably, the mobile device holder is further provided with a wireless charging coil, whose position is adapted to at least one wireless charging device.

The device holder of the present invention is suitable for mobile terminal devices such as mobile phone, and is particularly suitable for vehicle device holders. On the basis of current gravitational device holders, the present invention is provided with a lock mechanism which causes the link mechanism to enable one-way linkage, so that the link mechanism can rotate only in the direction that the clamping arm clamps the mobile phone. Therefore, when the lock mechanism is not unlocked, even if the device holder bumps, the holder would not loosen and the mobile device would not fall off the holder.

BRIEF DESCRIPTION OF THE DRAWINGS

To better describe the technical scheme in the embodiments of the present invention or in related art, accompanying drawings needed in the description of the embodiments or related art are simply illustrated below. Obviously, accompanying drawings described hereinafter merely illustrate some embodiments of the present invention. For the ordinary skill in the field, other relevant accompanying drawings may be obtained according to these accompanying drawings without creative work.

Figure 1:
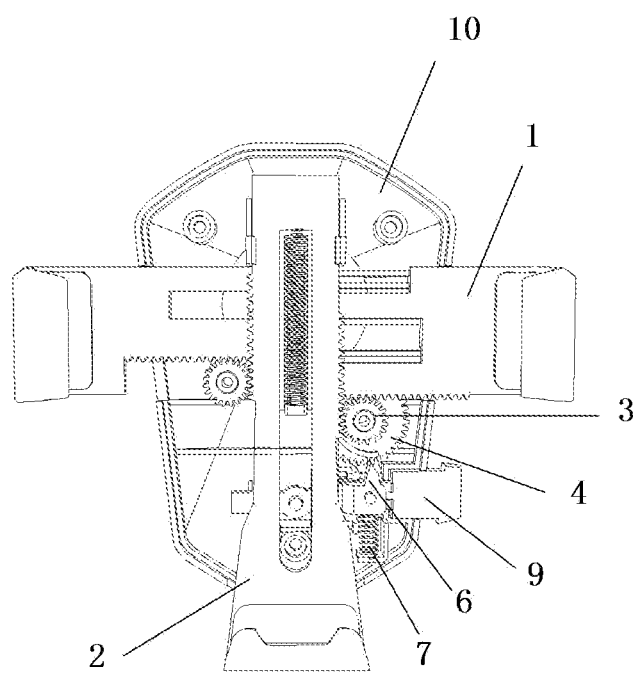
FIG. 1 is a main view of an internal structure of a mobile phone holder of the present invention.

Designators in the drawings: 1 represents a clamping arm, 2 represents a lower supporting arm, 3 represents a link gear, 4 represents a seat wheel. 41 represents a ratchet, 5 represents a block sheet, 6 represents a snap projection, 61 represents a snap shaft, 62 represents a limit seat, 63 represents a pawl, 7 represents a first reset spring, 71 represents a bracket, 8 represents second reset spring. 9 represents a button, 10 represents a rear cover, and 11 represents a coil.

DESCRIPTION OF THE EMBODIMENTS

The purpose, the technical scheme and the advantages of the present invention will become more clearly understood from detailed description of the technical scheme of the present invention. Obviously, the embodiments described hereinafter are simply part embodiments of the present invention, but all the embodiments. All other embodiments obtained by the ordinary skill in the art based on the embodiments in the present invention without creative work are intended to be included in the scope of protection of the present invention.

It should be noted that similar designators and letters express similar items in the drawings below. Therefore, once some item is defined in one drawing, no further definition and illustration are needed in the subsequent drawings. In the description of the present invention, it is to be noted that directional or positional terms such as "centre", "above", "below", "left", "right", "vertical", "horizontal", "inside", "outside", etc. are only used with reference to the orientation of the accompanying drawings, or are the common directions or positions for placement when the product of the present invention is used. The directional or positional terms are merely to conveniently describe the disclosure and simplify the description, but to indicate or imply the designated device or element to be constructed and operated in a specific position or in a specific direction. Therefore, the used directional or positional terms cannot be understood as a limit to the disclosure. In addition, terms such as "first", "second", "third", etc. are used merely for the purpose of distinguishing, but cannot be understood as the indication or implication of relative importance.

Taking a mobile phone holder for example, this paper describes the structure of the mobile device holder of the present invention in detail below in conjunction with the drawings. As shown in FIG. 1, a mobile phone holder includes a clamping arm 1 and a lower supporting arm 2; and the clamping arm 1 and the lower supporting arm 2 have a link mechanism provided therebetween. A mobile phone is placed in a space defined by the clamping arm 1 and the lower supporting arm 2, and the mobile phone presses downwards the lower supporting arm 2 by means of the gravity of the mobile phone itself. The clamping arm 1 and the lower supporting arm 2 are in a linkage through the link mechanism. The clamping arms 1 on the two sides move inwards to clamp the mobile phone. The link mechanism may be provided as a link gear 3 and the like.

A spring is provided between the lower supporting arm 2 and the housing. When the lower supporting arm 2 moves downwards, the spring forms a resilient force. When the mobile phone moves upwards under the action of an external force, the lower supporting arm 2 loses the pressure and rebounds upwards under the action of the spring. At such time, under the action of the link gear 3, the clamping arms 1 on the two sides open towards two sides. As a result, the mobile phone gets out of control.

The main feature of the invention lies in designing a lock mechanism at the link gear 3 to limit the rotation of the link gear 3, so that the link gear 3 can rotate in only one direction. The lock mechanism can also be unlocked, so that the link gear 3 rotates freely. The specific structure of the lock mechanism is described below in detail in conjunction with specific embodiments.

Embodiment 1

The lock mechanism in the present embodiment includes at least one snap projection 6 which is capable of causing the link gear 3 to be rotated in only one direction. In the condition that the link mechanism is provided as a link gear 3, the snap projection 6 is provided having one end clamped into the tooth space of the link gear 3 and having the other end fixed relative to a rotating shaft of the link gear 3. The end of the snap projection 6 inserted into the tooth space is designed to be a special shape, that is, one side surface of the clamped end in contact with one side of the tooth space is designed as to be a gentle slope, so that, when the link gear 3 is rotated clockwise (or anticlockwise), the engaging tooth of the link gear 3 can slide over the gentle slope and the snap projection 6 does not block the clockwise (or anticlockwise) rotation of the link gear 3. The other side surface of the clamped end in contact with the other side of the tooth space is designed to be a steep slope, for limiting the anticlockwise (or clockwise) rotation of the link gear 3. Thus, the link gear 3 can rotate in only one direction under the action of the snap projection 6, that is, the link gear 3 rotates in the direction that the mobile phone holder clamps the mobile phone. Since the link gear 3 cannot be rotated in a reversed direction, in the condition that the snap projection is not unlocked by an external force, the mobile phone holder cannot be unlocked automatically, consequently, the mobile phone cannot fall off the mobile phone holder.

Embodiment 2

The present embodiment and the Embodiment 1 differ in that the former one provides a seat wheel 4 coaxial to the gear 3, the seat wheel 4 has an edge provided with a ratchet 41, the snap projection 6 has a tail end provided with a pawl 63, and the pawl 63 and the ratchet 41 are matched so that the link gear 3 is rotated in only one direction. As the seat wheel 4 serves as one part of the lock mechanism, the snap projection 6 does not act on the gear 3 directly. Thus, the abrasion of the gear 3 can be reduced and the service life of the mobile phone holder can be prolonged. The edge of the seat wheel 4 is designed to be the ratchet 41 and is matched with the pawl 63, so that the one-way locking function of the gear 3 is easily realized. Of course, the edge of the seat wheel 4 also can be designed to be a gear structure. The edge can be designed flexibly according to actual productions and usages.

Figure 2:
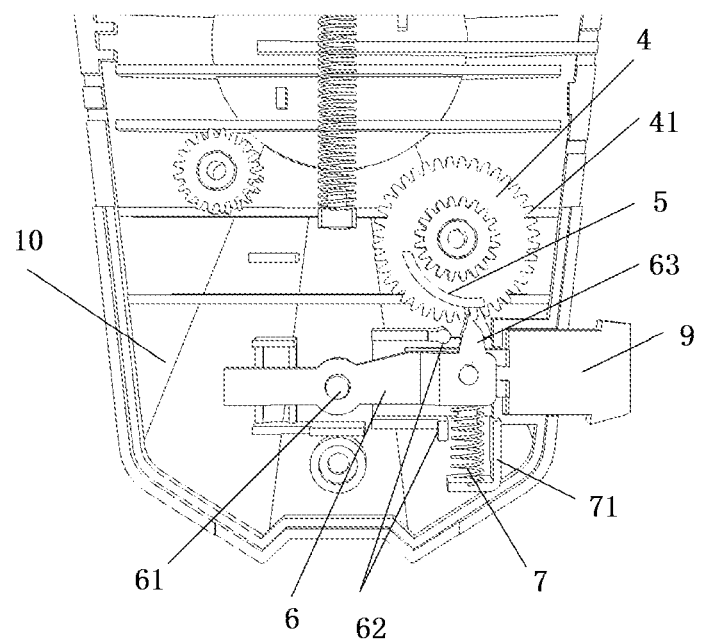
FIG. 2 is a detailed view of a fixing part of a mobile phone holder of the present invention.

Specifically, as shown in FIG. 2, the seat wheel 4 is arranged coaxial to the link mechanism, such as the link gear 3; and the outer diameter of the seat wheel 4 is greater than that of the link gear 3. The seat wheel 4 has the edge provided with the ratchet 41, and the ratchet 41 is matched with the pawl 63 of the snap projection 6. The snap projection 6 is in rotatable connection with a rear cover of the mobile phone holder through a snap shaft 61, so that the snap projection 6 is capable of swinging at least within a small angle range around the snap shaft 61. The swinging angle of the snap projection 6 can be limited by the arrangement of a limit seat 62.

The limit seat 62 is arranged respectively at the highest point and the lowest point to which the snap projection 6 swings. The position of the limit seat 62 at the highest point is arranged such that the pawl 63 does not contact the gear 3 at the highest point, and the position of the limit seat 62 at the lowest point is arranged such that the pawl 63 at least can be disengaged from the ratchet 41.

The seat wheel 4 has a block sheet 5 provided on the surface thereof. The block sheet 5 is used for blocking the pawl 63 and is used for pushing the pawl 63 into the ratchet 41 when the seat wheel 4 is rotated. The block sheet 5 is provided transiting to the edge of the seat wheel 4 in a spiral form around the center of the seat wheel 4 and is provided as at least one section close to the ratchet 41. The block sheet 5 has a start end slightly higher than the top end of the pawl 63 obtained when the snap projection 6 swings to the highest point. In this way, when the seat wheel 4 is rotated, the top end of the pawl 63 slides downwards along the block sheet 5 and finally contacts the ratchet 41 at the tail end of the block sheet 5, so that the pawl 63 can be clamped into the ratchet 41 under the action of a thrust towards the ratchet 41.

In order to realize the up-down swing of the snap projection 6, a reset device is provided between the snap projection 6 and the rear cover 10. The reset device can be provided on the snap shaft 61, having one end connected to the rear cover 10 and the other end connected to the snap projection 6, so that the snap projection 6 has a tendency of restoring to the original position when swinging.

The reset device can be provided as a spring. A first reset spring 7 is provided below the snap projection 6. When the pawl 63 is accommodated in the ratchet 41, the first reset spring 7 is compressed. When the snap projection 6 is disengaged from the ratchet 41 under the action of an external force, the snap projection 6 moves upwards under the action of the first reset spring 7 and props against the block sheet 5. A bracket 71 is provided below the first reset spring 7. The bracket 71 is fixed with a lower cover and extends in the direction towards an upper cover to support the first reset spring 7.

Figure 3:
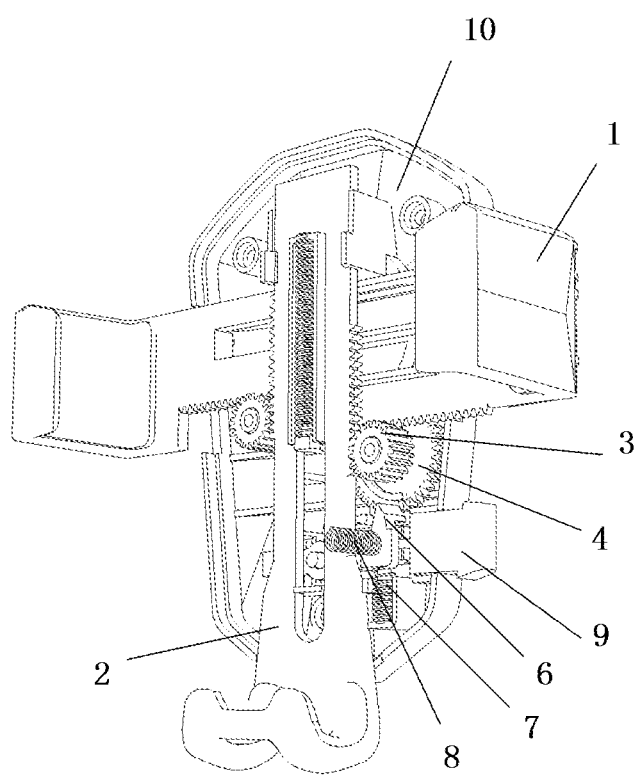
FIG. 3 is a perspective view of an internal structure of a mobile phone holder of the present invention.

FIG. 3 is a perspective view of an internal structure of a mobile phone holder of the present invention, in which a second reset spring 8 is provided on the outside of the snap projection 6 (along the outward direction of the paper). In fact, while the product is designed, the mobile phone holder should further include a front cover. The second reset spring 8 is provided between the front cover and the snap projection 6, so that the pawl 63 can be pushed inwards into the ratchet 41 (along the inward direction of the paper) under the action of the second reset spring 8.

Figure 4:
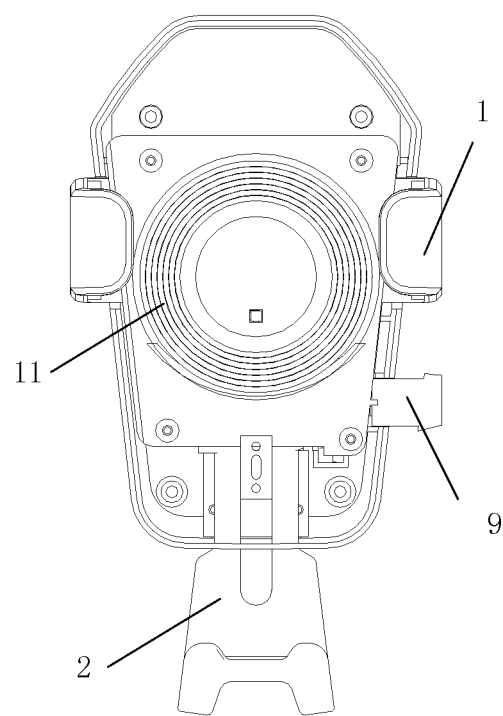
FIG. 4 is a diagram illustrating an embodiment of a mobile phone holder having a wireless charging function of the present invention.

A button 9 is provided between the snap projection 6 and the rear cover 10 of the mobile phone holder, for raising the snap projection 6 outwards until the pawl 63 is disengaged from the ratchet 41. As shown in FIG. 4, the button 9 is capable of moving towards the inside of the mobile phone holder along the rear cover 10, and the end part of the button 9 in contact with the snap projection 6 is designed to be a slope. When the button 9 is pressed in the direction towards the inside of the holder, the slope can slowly push the snap projection to move upwards until the pawl 63 is disengaged from the ratchet 41. A third reset spring is provided between the button 9 and the rear cover 10. When the button 9 is pressed, the third reset spring is compressed to deform. When the pressure applied to the button 9 is relieved, the third reset spring recovers from deformation, so that the button 9 returns to the initial position before press.

In an optional embodiment of the present invention, the mobile device holder is further provided with a wireless charging coil 11, which is used for wirelessly charging a mobile device placed thereon. Since the holder of the present invention has a locking function, the mobile device cannot move randomly in the holder, and the wireless charging coil built in the mobile device can keep opposite the wireless charging device on the device holder to implement the wireless charging function. The position of the wireless charging coil 11 on the mobile device holder can be arranged being matched with the position of the wireless charging device in the mobile device. For various types of mobile devices, a plurality of coils 11 can be provided on the holder. These coils can be selectively communicated, so that different mobile devices can be matched with corresponding wireless charging coils 11.

The mobile device holder according to the present embodiment has the following obvious advantages.

1. When the holder is mounted on a vehicle, it is more appropriate to experience wireless charging in the order receiving process.

Since the holder has a good fixing structure, instable charging resulted from shaking is avoided during the wireless charging process.

The above are the specific embodiments of the present invention. However, the protection scope of the present invention is not limited to the embodiments. Any variations or substitutions easily produced by one skill familiar with the technical field are intended to fall within the scope of protection of the present invention. Therefore, the scope of protection of the present invention should be based on the protection scope of the claims appended herein.

What is claimed is:

1. A mobile device holder, comprising a clamping arm, a lower supporting arm and a link mechanism, the link mechanism linking the clamping arm and the lower support arm in a rotatable manner, wherein the mobile device holder further comprises a lock mechanism, which acts on the link mechanism and causes the link mechanism to enable one-way linkage and wherein the link mechanism is provided as a link gear, the lock mechanism is provided as a snap projection which is fixed relative to a gear shaft of the link gear, and the snap projection and the link gear are in snap-fit connection of one-way rotation.

2. The mobile device holder according to claim 1, wherein the link mechanism is provided as a link gear, the lock mechanism is provided as a snap projection which is fixed relative to a gear shaft of the link gear, and the snap projection and the link gear are in snap-fit connection of one-way rotation.

3. The mobile device holder according to claim 2, wherein the link mechanism is provided as a link gear and further comprises a seat wheel, the seat wheel and the link gear are fixed coaxially, the seat wheel has an edge provided with a ratchet, the snap projection has a tail end provided with a pawl, the pawl and the ratchet are matched so that the link gear is rotated in only one direction.

4. The mobile device holder according to claim 3, further comprising a rear cover, wherein the snap projection and the rear cover have a first elastic element provided therebetween.

5. The mobile device holder according to claim 4, wherein the first elastic element is provided as a reset spring.

6. The mobile device holder according to claim 5, wherein the seat wheel has provided thereon an arc block sheet transiting to the edge of the seat wheel, and the arc block sheet is used for enabling the pawl to transit into the ratchet.

7. The mobile device holder according to claim 5, further comprising a front cover, wherein the snap projection and the front cover have a second elastic element provided therebetween, and the second elastic element is used for enabling snap projection to move in the direction towards the seat wheel.

8. The mobile device holder according to claim 7, wherein the second elastic element is provided as a reset spring.

9. The mobile device holder according to claim 1, comprising a button, which acts on the snap projection so that the snap projection is disengaged from the link gear.

10. The mobile device holder according to claim 9, further comprising a wireless charging coil, whose position is adapted to at least one wireless charging device.

* * * * *